United States Patent
Arras et al.

(10) Patent No.: US 10,626,826 B2
(45) Date of Patent: Apr. 21, 2020

(54) METHOD FOR CHECKING THE TIGHTNESS OF A FUEL SUPPLY SYSTEM

(71) Applicant: Bayerische Motoren Werke Aktiengesellschaft, Munich (DE)

(72) Inventors: Emmanuel Arras, Munich (DE); Markus Huber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 174 days.

(21) Appl. No.: 15/964,861

(22) Filed: Apr. 27, 2018

(65) Prior Publication Data

US 2018/0245544 A1    Aug. 30, 2018

Related U.S. Application Data

(63) Continuation of application No. PCT/EP2016/070667, filed on Sep. 1, 2016.

(30) Foreign Application Priority Data

Oct. 28, 2015  (DE) ...................... 10 2015 221 055

(51) Int. Cl.
*F02M 25/08* (2006.01)
*B60K 15/035* (2006.01)
(Continued)

(52) U.S. Cl.
CPC ... *F02M 25/0818* (2013.01); *B60K 15/03504* (2013.01); *F02M 25/089* (2013.01);
(Continued)

(58) Field of Classification Search
CPC ..... G01M 3/26; G01M 15/09; F02M 25/0818
See application file for complete search history.

(56) References Cited

U.S. PATENT DOCUMENTS

| 5,146,902 A | 9/1992 | Cook et al. |
| 5,460,135 A | 10/1995 | Ohashi et al. |

(Continued)

FOREIGN PATENT DOCUMENTS

| DE | 10 2008 046 586 A1 | 3/2010 |
| DE | 10 2012 212 109 A1 | 5/2014 |

(Continued)

OTHER PUBLICATIONS

German Search Report issued in counterpart German Application No. 10 2015 221 055.3 dated Jul. 15, 2016 with partial English-language translation (Eleven (11) pages).

(Continued)

*Primary Examiner* — Paul M. West
(74) *Attorney, Agent, or Firm* — Crowell & Moring LLP

(57) ABSTRACT

A method for checking the tightness of a fuel supply system of a motor vehicle is provided. The fuel supply system includes a volume-changing element, which is provided in the fuel tank and the volume of which is connected to the environment. The fuel tank is typically closed off from the environment by way of a valve unit. For tightness testing, a differential pressure with respect to the environment is produced in the tank interior by way of a gas-conveying device while the volume change element is connected to the environment. The differential pressure is held by switching a suitable shut-off valve and is monitored over a certain time span or checked after a certain time span. Sufficient tightness of the fuel supply system is inferred if the differential pressure still exceeds a certain threshold value after the time span.

3 Claims, 2 Drawing Sheets

(51) Int. Cl.
*G01M 3/26* (2006.01)
*G01M 15/09* (2006.01)

(52) U.S. Cl.
CPC .... *F02M 25/0809* (2013.01); *F02M 25/0836* (2013.01); *G01M 3/26* (2013.01); *G01M 15/09* (2013.01)

(56) References Cited

U.S. PATENT DOCUMENTS

| 5,868,120 | A | 2/1999 | Van Wetten et al. |
| 5,925,817 | A | 7/1999 | Kidokoro et al. |
| 2003/0136182 | A1 | 7/2003 | Streib |
| 2016/0167510 | A1 | 6/2016 | Weigl et al. |
| 2017/0087980 | A1 | 3/2017 | Arras et al. |

FOREIGN PATENT DOCUMENTS

| DE | 10 2013 209 716 A1 | 11/2014 |
| EP | 1 028 017 A2 | 8/2000 |
| WO | WO 01/69073 A1 | 9/2001 |
| WO | WO 2016/012284 A1 | 1/2016 |

OTHER PUBLICATIONS

International Search Report (PCT/ISA/210) issued in PCT Application No. PCT/EP2016/070667 dated Nov. 2, 2016 with English-language translation (Seven (7) pages).

German-language Written Opinion (PCT/ISA/237) issued in PCT Application No. PCT/EP2016/070667 dated Nov. 2, 2016 (Five (5) pages).

German Search Report issued in counterpart German Application No. 10 2015 221 053.7 dated Jul. 18, 2016 with partial English-language translation (Twelve (12) pages).

International Search Report (PCT/ISA/210) issued in PCT Application No. PCT/EP2016/070665 dated Nov. 2, 2016 with English-language translation (Seven (7) pages).

German-language Written Opinion (PCT/ISA/237) issued in PCT Application No. PCT/EP2016/070665 dated Nov. 2, 2016 (Five (5) pages).

METHOD FOR CHECKING THE TIGHTNESS OF A FUEL SUPPLY SYSTEM

CROSS REFERENCE TO RELATED APPLICATIONS

This application is a continuation of PCT International Application No. PCT/EP2016/070667, filed Sep. 1, 2016, which claims priority under 35 U.S.C. § 119 from German Patent Application No. 10 2015 221 055.3, filed Oct. 28, 2015, the entire disclosures of which are herein expressly incorporated by reference.

This application contains subject matter related to U.S. application Ser. No. 15/964,517, entitled "Method for Testing the Tightness of a Fuel Supply System" filed on even date herewith.

BACKGROUND AND SUMMARY OF THE INVENTION

The invention relates to a method for testing the leaktightness of a fuel supply system of a motor vehicle, including a fuel tank, in the interior space of which there is provided a volume-changing element, the so-called compensation volume of which is normally connected, in particular with the interposition of an accumulator unit for gaseous fuel constituents, to the surroundings. The interior space of the fuel tank, which can be filled with fuel for a consumer, is connectable to the surroundings by way of a valve unit which is normally open during the filling of the fuel tank and in the event of an exceedance of a positive-pressure threshold value in the region of up to 100 mbar and in the event of an undershooting of a negative-pressure threshold value. The "positive pressure" and "negative pressure" relate to the difference between the pressure in the tank interior space and the ambient pressure. The valve unit is otherwise closed. A fuel supply system of said type is described in the international patent application with the file reference PCT/EP2015/065891.

The legal requirements placed on the prevention of emissions from motor vehicle tank systems have over time become extremely high. Under virtually all conceivable circumstances, taking into consideration different country-specific regulations (e.g., the different nations of the world issue different regulations), practically no gaseous fuel constituents (e.g., these are normally hydrocarbons) should pass out of the interior space of the tank into the surroundings. As is known, particularly large quantities of such gaseous fuel constituents are encountered during the filling of the fuel tank with fresh fuel, but also as a result of a temperature increase in the case of the motor vehicle being at a standstill for a relatively long period of time. In conjunction with the latter, a person skilled in the art is familiar with the expression "diurnal losses", that is to say the losses of gaseous fuel constituents, or the quantity of gaseous hydrocarbon emissions, that must be discharged from the tank interior space owing to temperature fluctuations (for example resulting from the change between day and night) when the motor vehicle is at a standstill for a relatively long period of time in order to prevent the generation of inadmissibly high positive pressure in the tank interior space. It is however also necessary to discharge hydrocarbon emissions that form in the tank owing to temperature changes during the operation of the motor vehicle. In each case, the adherence to vapor pressure equilibrium in the tank leads to such emissions. As is known, at least these emissions that do not occur during the filling of the fuel tank are temporarily stored in an activated carbon filter or the like, which in the present application is generally referred to as accumulator unit for gaseous fuel constituents, until an internal combustion engine which is supplied with fuel from the fuel tank (and which is normally provided as a vehicle drive unit) is suitably set in operation such that said accumulator unit can then be purged. The fuel constituents temporarily stored in the activated carbon filter are supplied to the internal combustion engine for combustion. For the sake of completeness, it is also pointed out that, in specific countries, it is conventional for hydrocarbon emissions that occur during the filling of the tank either to be suctioned off during the filling process at the refueling station itself (for example, "ECE system" in the European Union) or to likewise be stored in a then adequately large-dimensioned activated carbon filter or in a corresponding storage unit (for example, ORVR (Onboard Refueling Vapor Recovery) in the USA).

With regard to an avoidance of the above-mentioned "diurnal losses" or other operational hydrocarbon emissions, pressure tanks have already been proposed, or are already in series production, in which a correspondingly high positive pressure (and a low negative pressure) can prevail such that no discharge of fuel vapors from the tank need occur other than in extreme exceptional circumstances, but such pressure tanks are highly cumbersome. Also known are measures for reducing the formation of gaseous fuel constituents in the tank interior space, in particular in conjunction with a filling process of the fuel tank, as in, for example, U.S. Pat. No. 5,460,135. Specifically, for the USA, it is the case that all gaseous hydrocarbon emissions that occur during the filling of a vehicle fuel tank must be temporarily stored in a storage unit for gaseous fuel constituents situated on board the vehicle. To reduce the quantity of such gaseous hydrocarbon emissions, said cited document provides, in the fuel tank, a flexible air bladder which exhibits its minimum volume when the tank is completely filled with fuel and which is continuously filled with ambient air during the extraction of liquid fuel from the tank, whereas an evacuation of said air bladder is prevented. Therefore, it is self-evidently possible for only a smaller quantity of fuel vapors to form above the liquid level in the tank than in an otherwise identical tank without an air bladder of said type. In conjunction with refilling of the tank, said air bladder is then evacuated into the surroundings through the storage tank or activated carbon filter.

The international patent application with the file reference PCT/EP2015/065891 as cited above has described a fuel supply system, the functional principle of which is based on the recognition that, owing to the vapor pressure equilibrium in a fuel tank which is almost completely filled with liquid fuel, fewer gaseous fuel constituents form above the liquid level than in the same fuel tank when the latter is only, for example, half full or less. Consequently, with a flexible air bladder or the like which is provided above the liquid level formed by liquid fuel in the tank interior space, the quantity of fuel constituents that transition into the gaseous state in the tank interior space can be reduced. In said patent application, and also in the present case, reference will be made below not to an "air bladder," but more generally to a volume-changing element which, arranged in the interior space of the tank, has or encloses a variable compensation volume which is or can be connected to the surroundings. Accordingly, the volume-changing element can breathe, as it were, that is to say can become larger or smaller in accordance with demand and thus react to changed boundary conditions.

A (further) legal licensing requirement for motor vehicles for example in the United States of America is that the entire region of the fuel supply system in which gaseous fuel constituents can be present is automatically checked for leak-tightness at regular intervals. Normally, such leak-tightness tests are performed by way of an electronic control unit during every driving cycle or every second driving cycle of the motor vehicle. Here, a leak, for example in the form of a hole with a diameter of only 0.5 mm, must be immediately detected, and the existence of such a leak must be indicated to the user of the motor vehicle. For this purpose, in the customary prior art, in that region of the fuel supply system in which gaseous fuel constituents can be present, the pressure and the temperature (of the gases situated in said region or, in the case of sensors being arranged in an upper region of the fuel tank, if the latter is completely filled, also of the liquid fuel situated there) are detected by way of suitable sensors over a certain time period. Said region also includes the fuel vapor intermediate store.

It is an object of the present invention to specify, for a fuel supply system, e.g., according to the above-cited international patent application with the file reference PCT/EP2015/065891, a suitable method for testing the leak-tightness thereof.

This and other objects are achieved by a method for testing a leak-tightness of a fuel supply system of a motor vehicle, where, by way of a gas-conveying device, a differential pressure in relation to the surroundings is generated in the tank interior space with the volume-changing element connected to the surroundings, and, through switching of a suitable shut-off valve, is held and monitored over a certain (or predetermined) period of time or inspected after a certain (or predetermined) period of time. If the differential pressure still exceeds a certain (or predetermined) threshold value after this time period, adequate leak-tightness of the fuel supply system is inferred. Conversely, if the differential pressure does not exceed the threshold value a leak can be directly inferred, though there is also the risk of incorrect measurements or other disruptive influences. For such a reason, in an advantageous refinement of the invention, it is contemplated that, if the differential pressure lies below the stated threshold value after said time period, the above-described testing routine is performed again, and then inadequate leak-tightness of the fuel supply system is inferred only if a particular number of such testing routines which show inadequate leak-tightness of the fuel supply system have been performed in succession. Said particular number preferably lies in the range of, e.g., 2 to 4.

For the further explanation, it is firstly pointed out that, with regard to the features of a fuel supply system relevant for the present invention, reference is made to the full content of the cited international patent application with the file reference PCT/EP2015/065891, which does not constitute a prior publication, that is to say it is the intention for the entire content of said document to be incorporated into the content of the present patent application. Therefore, below, an exemplary embodiment of the present invention will be described on the basis of a fuel supply system which is illustrated in FIG. 1 of, and described in detail in, the above-cited international patent application.

According to an embodiment of the invention, a leak-tightness test of a fuel supply system of said type or of a fuel supply system similar thereto is performed in that, by way of a gas-conveying device (in particular in the form of an air pump driven by electric motor), a differential pressure in relation to ambient pressure is generated only in that part of the test-subject region of the fuel supply system which also has to be tested for leak-tightness in a conventional fuel supply system that has no volume-changing element in the tank. This in particular also includes the fuel tank itself, such that a differential pressure in relation to ambient pressure is generated in the fuel-fillable volume of said fuel tank. The gas-conveying device is thereupon deactivated and, as a result of suitable valves being closed, said generated differential pressure (for example negative pressure) is, in effect, confined. If said negatively pressurized part of the fuel supply system is leak-tight, then said differential pressure should exist for a certain (predetermined) period of time, for which reason the value of said differential pressure (for example negative pressure) is queried or checked again at least after the expiry of a certain (predetermined) time period.

Said part of the fuel supply system which is charged with a differential pressure (in relation to ambient pressure) for the leak-tightness test may now have a leak either in a line section or at the fuel vapor buffer accumulator or at some other location and be connected to the surroundings there, whereby said differential pressure would be depleted. Said part of the fuel supply system which is charged with a differential pressure can however also be connected to the surroundings via the volume-changing element, which according to an embodiment of the invention itself is connected to the surroundings, if a wall or casing wall (or the like) of the volume-changing element, which delimits the compensation volume of said volume-changing element and separates said compensation volume from the fuel-fillable remaining space of the tank, exhibits a leak. It would then specifically be the case that pressure equalization would occur via or through said volume-changing element. At the same time, and without additional effort, it is thus possible for the leak-tightness of the volume-changing element itself to be checked in a particularly simple manner.

If a change in the differential pressure value within said certain time period then lies below a particular suitably predefined pressure magnitude, the test-subject region of the fuel supply system can be regarded as exhibiting adequate leak-tightness; otherwise, there is a substantiated suspicion of a leak. That region of the fuel supply system for testing or tested by way of said method in this case encompasses the tank including the volume-changing element and a basically conventional accumulator unit for fuel vapors and the purge line thereof.

As has already been mentioned, the above-mentioned substantiated suspicion of a leak can be further confirmed if the testing discussed thus far, specifically the generation and monitoring of the maintenance of differential pressure, which may furthermore be a positive pressure or negative pressure in relation to ambient pressure, is performed several times in direct succession, resulting in a suspicion of a leak every time. For example, after three successive testing routines according to the invention which do not show adequate leak-tightness, it is possible to assume that a leak is present despite the possibility of incorrect measurements or adverse boundary conditions. By contrast, if adequate leak-tightness has been detected only once, adequate leak-tightness can be inferred with certainty, because, put simply, it is much more complicated to realize leak-tightness than a leak. Furthermore, the method according to the invention may be performed whenever suitable or (for example legally) required.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
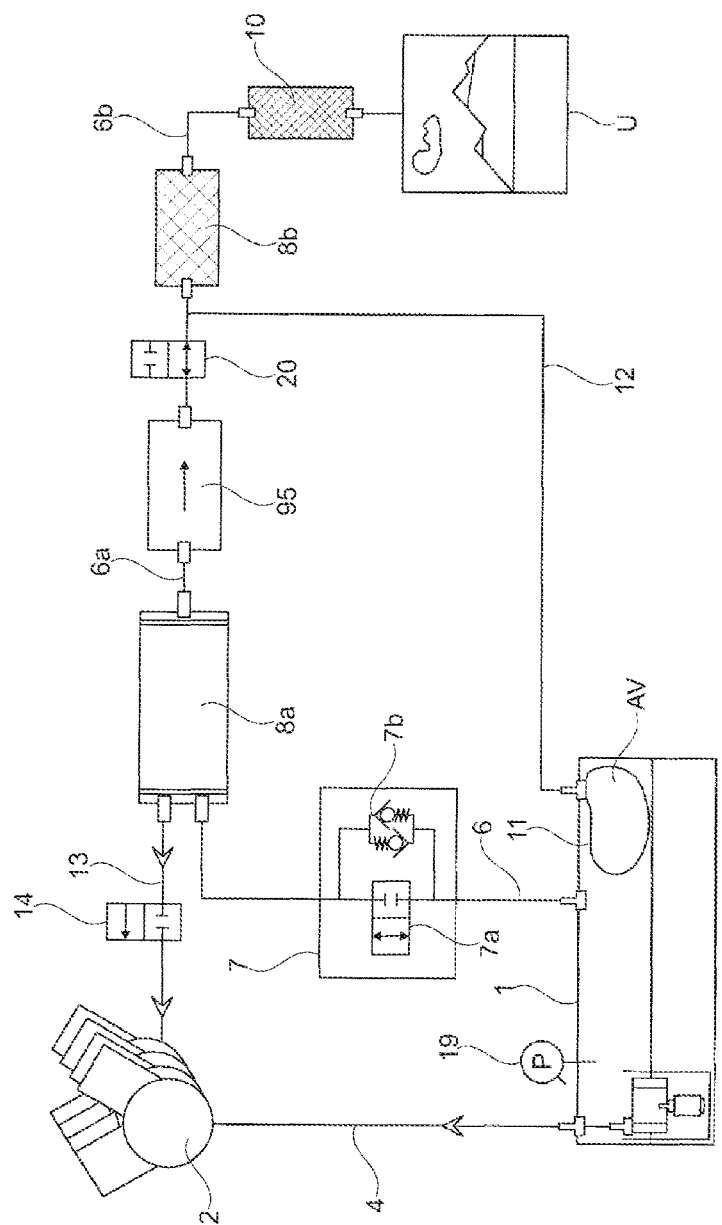
FIG. 1 is a diagrammatic illustration of a fuel supply system in which a leak-tightness testing method according to one or more embodiments of the invention is or can be carried out.
Figure 2:
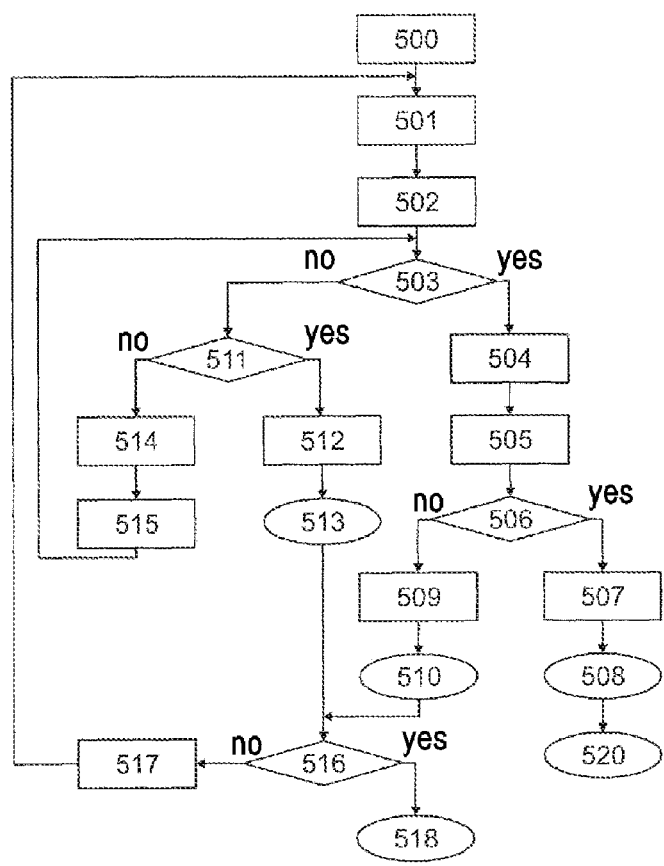
FIG. 2 is a flow diagram of a computer program installed in an electronic control unit

In the context of an exemplary embodiment, FIG. 1 (derived from FIG. 1 of the above-cited international patent application PCT/EP2015/065891 and using the reference signs therein) shows, in a diagrammatic illustration, a fuel supply system in which a leak-tightness testing method according to one or more embodiments of the invention is or can be carried out. Said method is illustrated in FIG. 2 as a flow diagram of a computer program installed in an electronic control unit. In the flow diagram in FIG. 2, rectangles denote actions (of the electronic control unit), whereas a rhombus denotes a query performed (by the control unit) and an ellipse denotes a result determined (by the control unit). The numerals 500 and above denote individual method steps described below.

Referring firstly to FIG. 1, a tank or fuel tank of a motor vehicle is denoted by the reference designation 1, and an internal combustion engine supplied with fuel from said tank is denoted by the reference designation 2. Fuel conveyed by way of a pump unit (not shown) provided in the tank 1 passes to said internal combustion engine 2 via a supply line 4. For the sake of simplicity, the illustration does not show a filler neck via which the tank 1 can be replenished with fuel.

A tank ventilation line 6 leads from the interior space of the tank 1 through a valve unit 7 to a first accumulator unit 8a filled with an adsorbent for gaseous fuel constituents, or the ventilation line 6 opens out in the interior space of an accumulator unit, which functions as a so-called activated carbon filter and which is denoted by the reference designation 8a, for gaseous fuel constituents that are gaseous and discharged from the tank interior space via the ventilation line 6 when the valve unit 7 is open. At the other end of said first accumulator unit 8a, the ventilation line 6 continues as line 6a and, after passing through a gas-conveying device 95 which is designed such that a gas flow can flow through the gas-conveying device 95 even when it is not in operation and after passing through a shut-off valve 20, opens out in a second accumulator unit 8b, also referred to as "honeycomb" or "low bleed emission activated carbon filter", for gaseous fuel constituents, which likewise includes activated carbon but with different storage characteristics. Emerging from said second accumulator unit 8b, the tank ventilation line 6 extends onward as line 6b through a dust filter 10 into the surroundings U. Also provided is a pressure sensor 19 by way of which the interior pressure in the tank 1 can be measured.

A volume-changing element 11 which in this case is in the form of a flexible and elastically deformable bladder is provided in the interior space of the tank 1, which volume-changing element encloses a compensation volume AV which, via a ventilation line 12, can be connected to the surroundings U or is normally connected to the surroundings U. For this purpose, the ventilation line 12, which opens out in the compensation volume AV of the volume-changing element 11, extends through the wall of the tank 1 and finally opens out in the line 6a which, as already discussed, connects the first accumulator unit 8a to the second accumulator unit 8b. The ventilation line 12 is thus connected, through the accumulator unit 8b for gaseous fuel constituents, to the surroundings U. The function of the volume-changing element 11 is discussed briefly in the introductory part of the present description and is discussed in detail in the international patent application with the file reference PCT/EP2015/065891, as already cited multiple times. This also applies to the function of the valve unit 7, also referred to as low-pressure tank shut-off valve, which in this case is formed by a parallel connection of two valve elements 7a, 7b.

The first valve element 7a is a shut-off valve that is actuatable by an electronic control unit and which is normally moved into its open position during refueling (i.e., filling of the tank 1 with fresh fuel) and in the event of an exceedance of a predefined limit pressure in the tank 1, and which is otherwise closed. In particular, with regard to the avoidance of an overshooting of the limit pressure (both with regard to positive pressure and with regard to negative pressure), the first valve element 7a is suitably actuated by a sensor (not shown) which measures the temperature T in the tank 1 in combination with the sensor 19 which measures the pressure P in the tank 1, while an impending refueling process, or a refueling process being carried out, can be identified, for example, by way of a refueling demand button for actuation by the user of the motor vehicle, or by way of a tank flap sensor.

Here, the second valve element 7b involves a pairing of mutually oppositely directed check valves which are connected in parallel and which automatically open only in the presence of a minimum pressure. Said check valves and/or said second valve element 7b are/is designed so as to open only in the presence of pressure values in the interior space of the tank 1 (outside the volume-changing element 11) which differ in terms of magnitude by, for example, 100 mbar from the pressure prevailing in the surroundings U, that is to say said second valve element 7b (which is connected functionally in parallel with the first valve element 7a) of the valve unit 7 opens when a positive pressure of approximately 100 mbar prevails in the tank interior space. As a result, fuel vapors pass out of the tank interior space into the two accumulator units 8a, 8b, where the gaseous fuel constituents are retained, whereas the air passes into the surroundings U, and said positive pressure thus is depleted. Alternatively, when a negative pressure of, for example, approximately 100 mbar prevails in the tank interior space, as a result of which air passes from the surroundings U into the tank interior space through the accumulator units 8a, 8b, and said negative pressure thus is depleted. By contrast to the explanation above, the check valves of the valve element 7b may however also be configured for different differential pressure values and/or different absolute values with regard to their opening, in such a way that the valve element 7b opens from the tank 1 to the surroundings U (or to the accumulator unit 8a) only when a positive-pressure limit value of, for example, 70 mbar has been reached in the tank 1. The valve element 7b opens from the surroundings U (or from the accumulator unit 8a) to the tank 1 only when a negative-pressure limit value which is smaller, or no higher, in terms of magnitude than the above-mentioned positive-pressure threshold value, and which may, for example, lie in the region of 30 mbar, is reached in the tank 1. The range within which expedient pressure values lie extends from approximately 5 mbar to approximately 100 mbar.

When the motor vehicle is at a standstill over a practically unlimited or at least relatively high number of days, however, the valve unit 7 should not open at all on a tank system of said type. Rather, then, the varying volume of the fuel situated in the tank interior space, or the change in vapor pressure thereof, owing to varying ambient temperatures (in particular owing to day and night) is compensated exclusively by way of a change in volume of the volume-changing element 11 which, for this purpose, via the (permanently open) ventilation line 12 and the second accumulator unit 8b, either discharges air from the compensation volume AV of the volume-changing element 11 to the surroundings U or takes in air from the surroundings U. This process of the expansion of the volume-changing element 11 with an enlargement of the compensation volume AV or decrease in size of the volume-changing element 11 with a decrease of the compensation volume AV as a result of exchange of air with the surroundings U can continue practically infinitely with suitable dimensioning of the components involved, without increasing evaporation of fuel in the tank 1 necessitating an opening of the valve unit 7.

A purging or regeneration of the accumulator units 8a, 8b is also performed, which accumulator units, aside from receiving fuel constituents that diffuse through the wall of the volume-changing element 11 into the compensation volume AV thereof, are charged with fuel vapors in particular during a refueling process, that is to say during filling of the tank 1 with fresh fuel and possibly in the event of an exceedance of pressure limit values in the tank 1, as is customary in present tank systems. When the internal combustion engine 2 is in operation, for the purging of the accumulator units 8a, 8b, air from the surroundings U passes via the line 6b into the second accumulator unit 8b and onward through the line 6a and the first accumulator unit 8a through a purge line 13, in which there is provided a purge valve 14 which is then open but is otherwise closed, into the combustion chambers of the internal combustion engine 2, where the gaseous fuel constituents previously temporarily stored in the two accumulator units 8a, 8b and entrained by the purging air are burned.

Following this preliminary explanation, a description will now be given on the basis of FIG. 2 of a procedure or routine according to the invention for testing the leak-tightness of the fuel supply system as per FIG. 1, which is performed by an electronic processing and control unit as follows.

Step 500: start of the testing routine, for example on the basis of a stoppage of operation or start of operation of the motor vehicle or of the consumer (or internal combustion engine 2); here, a repeat counter for a repeat loop of this testing routine is set to the value "0" (zero).

Step 501: the valve unit 7, more specifically the valve element 7a thereof, which is closed when electrically deenergized, is opened.

Step 502: the gas-conveying device 95 is set in operation in the conveying direction illustrated in FIG. 1 by an arrow, and thus conveys air from the (at least partially fuel-filled) interior space of the tank 1, inter alia, through the shut-off valve 20, which is open when electrically deenergized and thus normally open, to the surroundings U. This is however not detrimental because the air discharged from the tank 1 is previously conducted through the accumulator units 8a, 8b, and here, upon or proceeding from this setting in operation, the operating time duration of the gas-conveying device 95 is also measured.

Step 503: it is checked whether the negative pressure in the tank interior space as measured by way of the pressure sensor 19 is lower than—20 mbar (in relation to ambient pressure); here, "lower" means that the magnitude of the negative pressure is greater than 20 millibar.

Step 504: if so, the shut-off valve 20 is closed and the gas-conveying device 95 is deactivated.

Step 505: a predefined time period, for example in the region of 1 minute, is allowed to elapse.

Step 506: it is checked (by way of the pressure sensor 19) whether a negative pressure of (for example) at least— 10 mbar (in relation to ambient pressure) still prevails in the fuel tank 1—this predefined magnitude, which constitutes a threshold value with regard to the result of the testing method, inevitably lies below the magnitude mentioned or considered in method Step 503.

Step 507: if so, the shut-off valve 20 is firstly opened, and for example one second later, the valve element 7a of the valve unit 7 is closed in order to restore the normal operating state.

Step 508: the fuel tank 1 with the volume-changing element 11 and the accumulator unit 8a and the associated lines including the purge line 13 can thus be classed as exhibiting an adequate sealing action, such that, in the following Step 520, the following can be stated:

Step 520: the testing routine has been successfully completed.

Step 509: if, by contrast, it is identified in step 506 that the pressure in the tank interior space lies above the value of for example minus 10 mbar predefined in said step (that is to say prevails as a negative pressure of a magnitude smaller than 10 mbar, that is to say for example is only 2 mbar, or even ambient pressure), then the normal operating state is restored analogously to Step 507. But, it is then not possible at any rate from this previously executed testing routine to infer leak-tightness of the partial region (which is to be tested for leak-tightness) of the fuel supply system including the fuel tank 1 with the volume-changing element 11 and the accumulator unit 8a and the associated lines including the purge line 13.

Step 510: rather, following the method Step 509, the method jumps to the method Step 516, which is a constituent part of a repeat loop which is provided in the complete testing routine and which will be discussed further below. Before that, however, the method steps that may alternatively follow method Step 503 will be discussed:

Step 511: specifically, if, in method Step 503, it is identified that the negative pressure generated in the tank interior space as a result of prior setting in operation of the gas-conveying device 95 has not (yet) reached the desired value of for example minus 20 millibar (and thus remains lower than this in terms of magnitude), then it is queried whether the gas-conveying device 95 has already been in operation for (for example) 60 seconds, that is to say whether 60 seconds have already elapsed since the execution of method Step 502.

Step 512: if so, the gas-conveying device 95 is deactivated, because it can be assumed that the desired pressure build-up in the tank 1 cannot occur owing to a leak.

Step 513: since it is not possible at any rate from this previously executed testing routine to infer leak-tightness of the partial region (which is to be tested for leak-tightness) of the fuel supply system including the fuel tank 1 with the volume-changing element 11 and the accumulator unit 8a and the associated lines including the purge line 13, the method jumps to the method Step 516 (already briefly mentioned further above), which is a constituent part of a repeat loop provided in the complete testing routine.

Step 514: by contrast, if it is identified in method Step 511 that the gas-conveying device 95 has still been in operation for less than 60 seconds, a time counter for the operating duration thereof is increased by the value "1", and in the following method step.

Step 515: the gas-conveying device 95 is operated for a further second, following which the method returns to method Step 503, in which it is queried whether the negative pressure in the tank interior space measured by way of the pressure sensor 19 is greater in magnitude than for example 20 millibar.

Step 516: in the above-mentioned repeat loop, it is queried how often the testing routine discussed above, that is to say composed of the method Steps 501 to 515 (insofar as the individual steps have actually had to be performed at all), has already been performed, specifically whether the repeat counter originally set to the value "0" in method Step 500 has in the meantime increased to a value greater than "2".

Step 517: if not, that is to say if the repeat counter still has one of the values "0" or "1" or "2", said repeat counter is increased by the value "1", and the method jumps to method step 501, in order to carry out the method Steps 501 to possibly 515 of the testing routine a further time for the sake of certainty, that is to say in order to increase the authoritativeness of the testing routine.

Step 518: by contrast, if it is identified in the method Step 516 that the repeat counter has the value "3" (and is thus greater than "2"), then, as a conclusion to the complete testing routine, that region of the fuel supply system which is to be tested, composed of the fuel tank 1 with the volume-changing element 11 and the accumulator unit 8a and the associated lines including the purge line 13, is classed as not exhibiting adequate leak-tightness, and this is communicated for example to the user of the motor vehicle in the hitherto customary manner.

It is finally expressly pointed out that the foregoing disclosure (e.g., the above-mentioned pressure values or time specifications etc. and also the threshold value of the repeat counter) has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Thus, the disclosed embodiments should not be construed to limit the scope of protection of the patent claims, and even the method steps may differ from those described above without departing from the scope of protection of the patent claims.

What is claimed is:

1. A method for testing a leak-tightness of a fuel supply system of a motor vehicle, the method comprising the acts of:
    providing a fuel tank including a volume-changing element in an interior space thereof, where a compensation volume of the volume-changing element is normally connected to surroundings;
    arranging the interior space of the fuel tank, which is fillable with fuel for a consumer, to be connectable to the surroundings by way of a valve unit such that the valve unit is open during filling of the fuel tank in an event of an exceedance of a positive-pressure threshold value in the region of up to 100 mbar and in an event of an undershooting of a negative-pressure threshold value between a pressure in the interior space of the fuel tank and an ambient pressure, and is otherwise closed;
    generating, by way of a gas-conveying device, a differential pressure in relation to the surroundings in the interior space of the fuel tank with the volume-changing element connected to the surroundings;
    holding and monitoring, through switching of a shut-off valve, over a predetermined period of time or inspecting after a predetermined period of time; and
    if the differential pressure still exceeds a predetermined threshold value after the predetermined period of time, determining the leak-tightness of the fuel supply system as adequate.

2. The method according to claim 1, wherein the compensation volume of the volume-changing element is connected, with an interposition of an accumulator unit for gaseous fuel constituents, to the surroundings.

3. The method according to claim 1, the method further comprising the act of:
    if the differential pressure lies below the predetermined threshold value after the predetermined period of time, repeating a testing routine according to the method of claim 1, and then determining the leak-tightness of the fuel supply system as inadequate only if a predetermined number, in the range from 2 to 4, of the testing routines which show inadequate leak-tightness of the fuel supply system have been performed in succession.

* * * * *